US011175573B2

(12) United States Patent
Kato et al.

(10) Patent No.: US 11,175,573 B2
(45) Date of Patent: Nov. 16, 2021

(54) LIGHT SOURCE DEVICE AND PROJECTOR

(71) Applicant: NEC Display Solutions, Ltd., Tokyo (JP)

(72) Inventors: Atsushi Kato, Tokyo (JP); Isao Takahashi, Tokyo (JP); Noriko Nagase, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 131 days.

(21) Appl. No.: 16/495,730

(22) PCT Filed: Mar. 24, 2017

(86) PCT No.: PCT/JP2017/012134
§ 371 (c)(1),
(2) Date: Sep. 19, 2019

(87) PCT Pub. No.: WO2018/173284
PCT Pub. Date: Sep. 27, 2018

(65) Prior Publication Data
US 2020/0096850 A1    Mar. 26, 2020

(51) Int. Cl.
*F21V 7/04* (2006.01)
*G03B 21/20* (2006.01)
(Continued)

(52) U.S. Cl.
CPC .......... *G03B 21/204* (2013.01); *G02B 27/18* (2013.01); *H04N 9/315* (2013.01)

(58) Field of Classification Search
CPC ... G02B 6/0003; G02B 6/0006; G02B 6/0068
See application file for complete search history.

(56) References Cited

U.S. PATENT DOCUMENTS 8,684,555 B2\* 4/2014 Hofmann ............. A61B 1/0684
                                              362/230
9,151,884 B2\* 10/2015 Rutherford ............... F21V 9/00
(Continued)

FOREIGN PATENT DOCUMENTS

| JP | 2006-511056 A | 3/2006 |
| JP | 2008-536266 A | 9/2008 |
| JP | 2014-010181 A | 1/2014 |

OTHER PUBLICATIONS

International Search Report (ISR) (PCT Form PCT/ISA/210), in PCT/JP2017/012134, dated Jun. 13, 2017.
(Continued)

*Primary Examiner* — Andrew J Coughlin
(74) *Attorney, Agent, or Firm* — McGinn IP Law Group, PLLC

(57) ABSTRACT

A light source device includes: a fluorescent rod that contains a fluorescent substance; at least one light-guide element including a first end face, a second end face having a smaller area than that of the first end face, and a side surface portion that reflects incident light from the first end face to condense on the second end face, the second end face being optically joined to a surface of the fluorescent rod except for the emission surface; a plurality of excitation light sources arranged to face the first end face of the light-guide element; and a dichroic film provided on the surface of the fluorescent rod expect for the emission surface and having the properties of transmitting excitation light and reflecting fluorescent light.

8 Claims, 6 Drawing Sheets

(51) Int. Cl.
*H04N 9/31* (2006.01)
*G02B 27/18* (2006.01)

(56) References Cited

U.S. PATENT DOCUMENTS

| | | | | |
|---|---|---|---|---|
| 10,352,521 | B2* | 7/2019 | Schmidt | F21S 41/285 |
| 10,698,150 | B2* | 6/2020 | Vrehen | G02B 6/0085 |
| 10,823,893 | B2* | 11/2020 | Hoelen | G02B 6/0038 |
| 2004/0264185 | A1* | 12/2004 | Grotsch | G03B 21/208 |
| | | | | 362/231 |
| 2006/0181872 | A1* | 8/2006 | Pashley | G02B 6/0001 |
| | | | | 362/231 |
| 2006/0227570 | A1* | 10/2006 | Rutherford | H04N 9/315 |
| | | | | 362/612 |
| 2007/0297190 | A1* | 12/2007 | Ng | G02B 6/0003 |
| | | | | 362/558 |
| 2011/0044070 | A1* | 2/2011 | Takahashi | F21K 9/61 |
| | | | | 362/553 |
| 2018/0363858 | A1* | 12/2018 | Peeters | G02B 6/00 |

OTHER PUBLICATIONS

Christoph Hoelen, Dick de Boer, Dominique Bruls, Joost van der Eyden, Rolf Koole, Yun Li, Mo Mirsadeghi, Vincent Vanbroekhoven, John-John Van den Bergh, and Patrick Van de Voorde, "LED light engine concept with ultra-high scalable luminance", Proc. SPIE 9768, Light-Emitting Diodes: Materials, Devices, and Applications for Solid State Lighting, XX, 976810 (Mar. 8, 2016).

* cited by examiner

[Fig. 1]
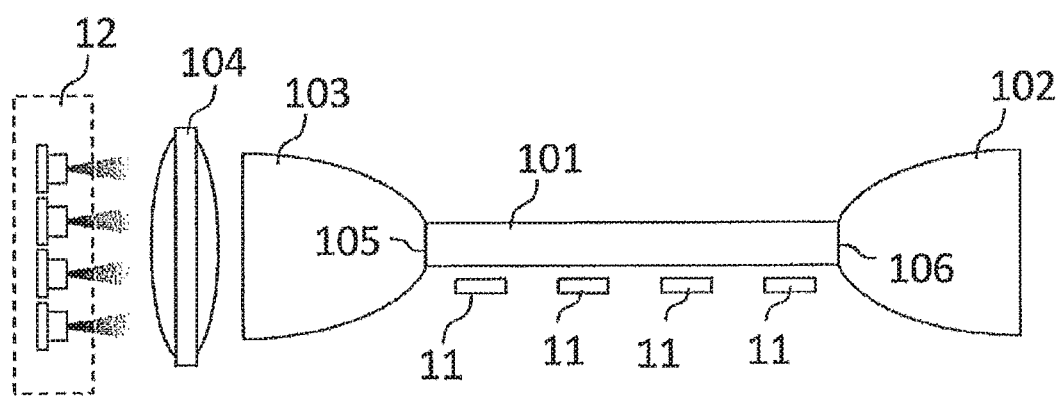

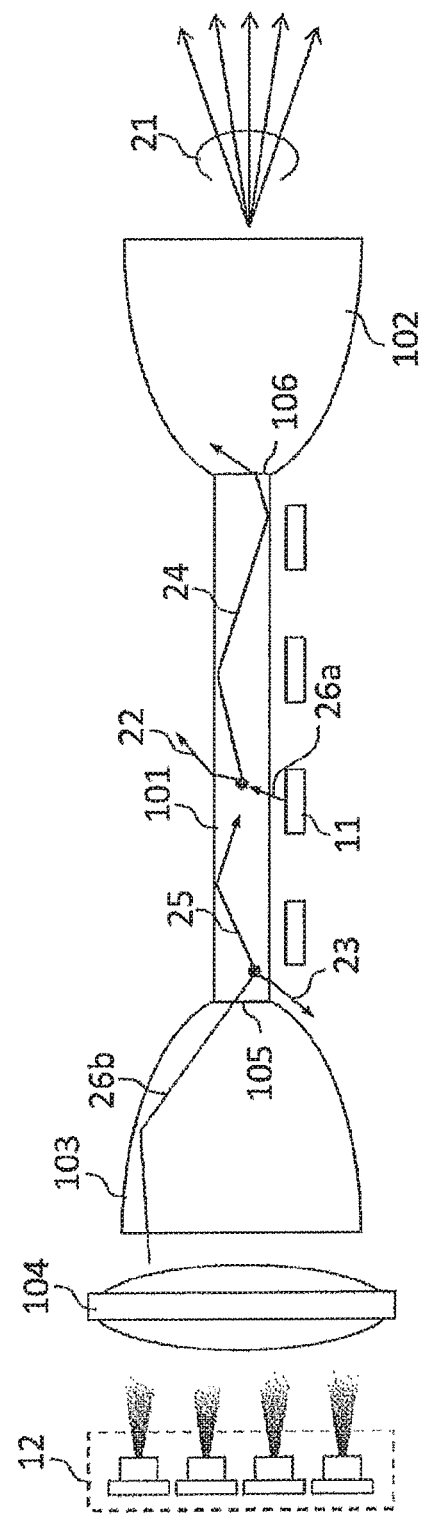
[Fig. 2]

[Fig. 3]
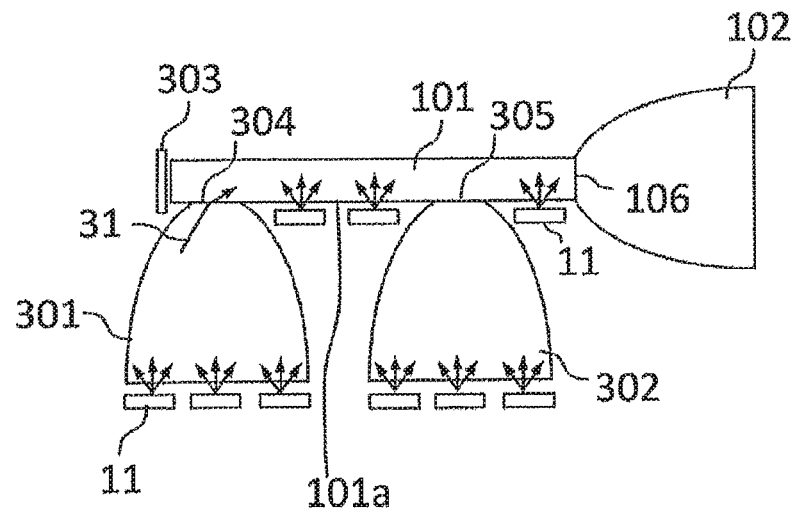
[Fig. 4]
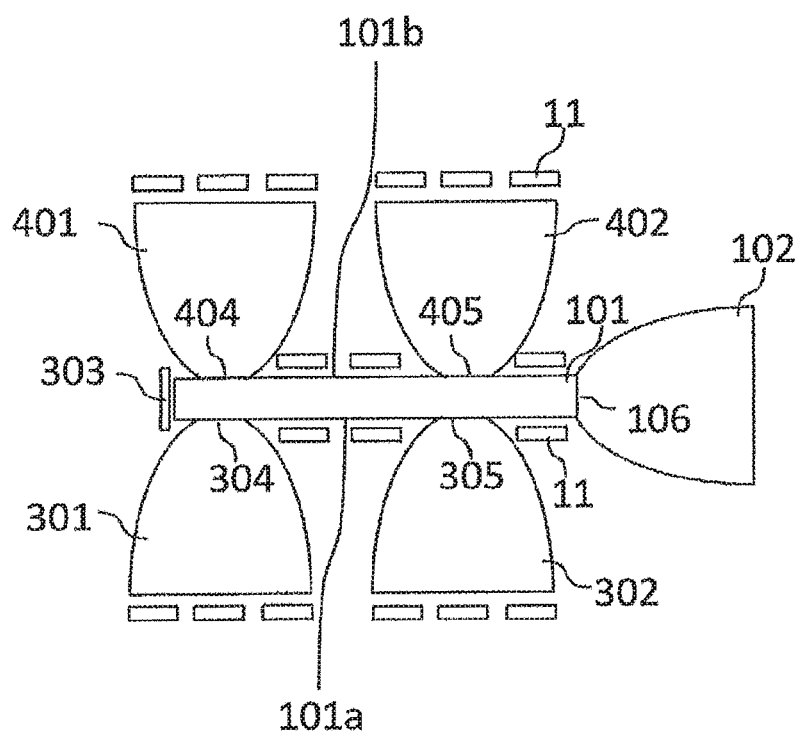

[Fig. 5]
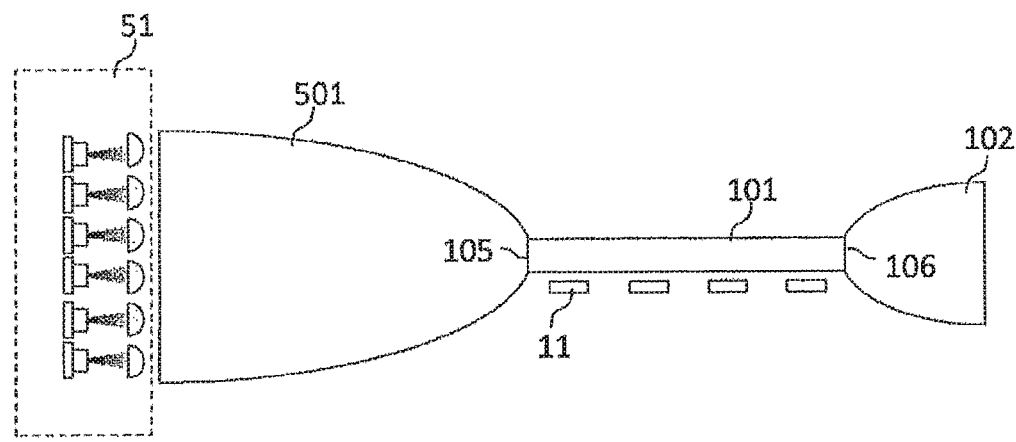
[Fig. 6]
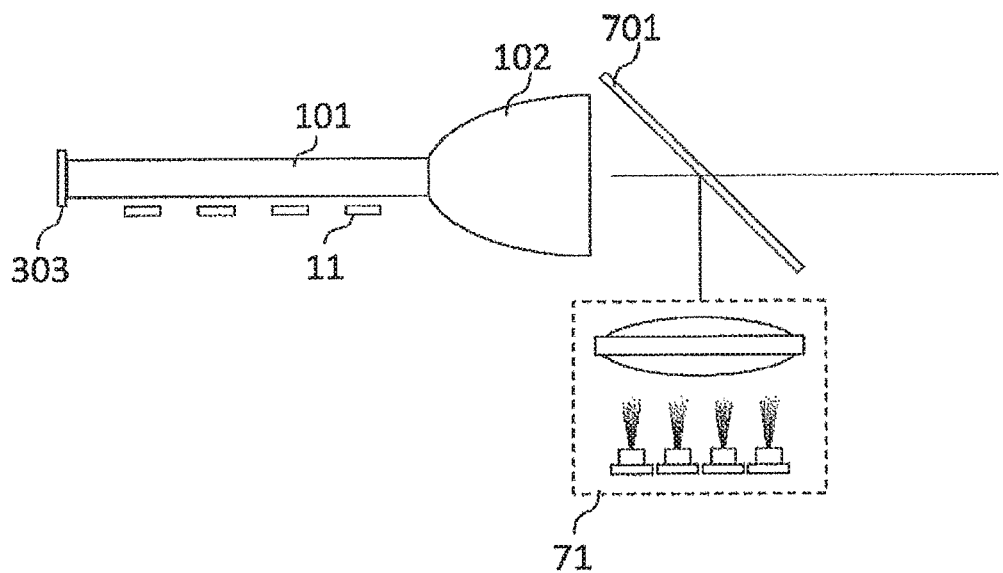

[Fig. 7]
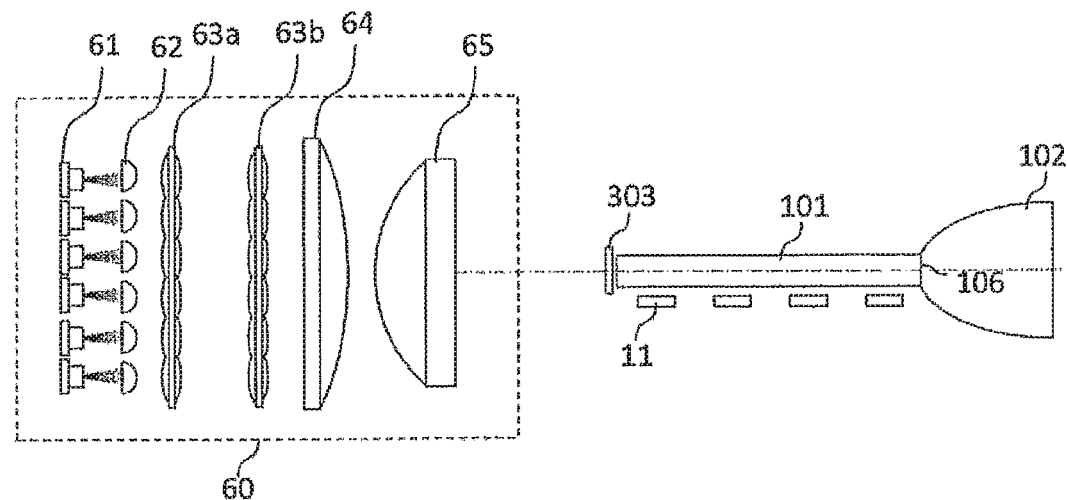
[Fig. 8]
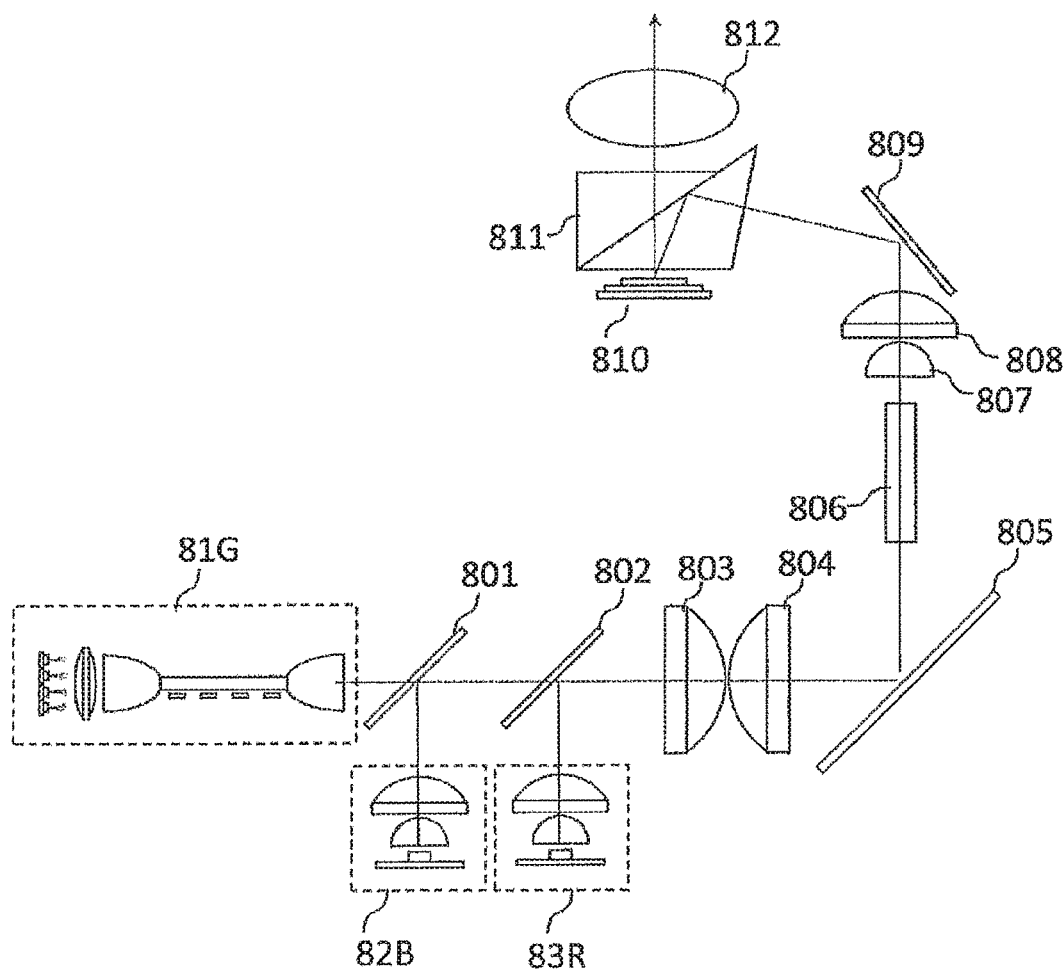

[Fig. 9]
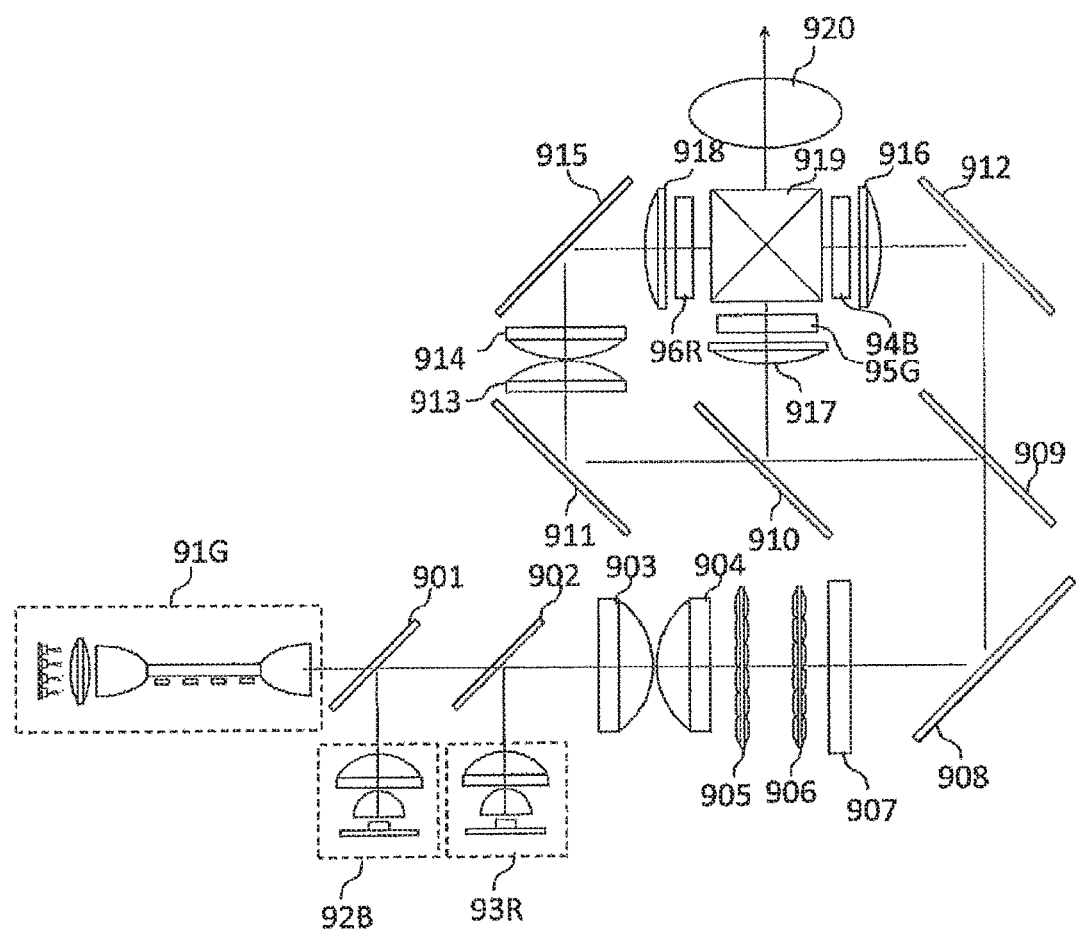

LIGHT SOURCE DEVICE AND PROJECTOR

TECHNICAL FIELD

The present invention relates to a light source device that is provided with a fluorescent rod that contains a fluorescent substance and a projector that uses this light source device.

BACKGROUND ART

Non-Patent Document 1 discloses an HLD (High Lumen Density) module that is provided with a square-column-shaped light-emission conversion rod that contains a fluorescent substance and in which a plurality of blue LEDs are arranged to face the side surface of the light-emission conversion rod. One of the two end faces of the light-emission conversion rod is an emission surface for emitting fluorescent light, and a CPC (Compound Parabolic Concentrator) element is provided on this emission surface. A mirror is provided on the other end face of the light-emission conversion rod.

In the above-described HLD module, each blue LED illuminates the side surface of the light-emission conversion rod. The blue light (excitation light) from each blue LED enters the rod interior from the side surface. In the rod interior, the fluorescent substance is excited by the blue light and fluorescent light is discharged isotropically from the fluorescent substance. Of the fluorescent light that entered the rod side surface, fluorescent light in which the angle of incidence exceeds the critical angle undergoes total reflection at the rod side surfaces, and fluorescent light in which the angle of incidence is equal to or less than the critical angle is emitted from the rod side surfaces to the exterior. Here, the critical angle refers to the minimum angle of incidence that produces total reflection when this angle of incidence is exceeded.

Fluorescent light that is discharged from the fluorescent substance is propagated through the rod while being repeatedly reflected by the side surfaces of the rod, and fluorescent light that reaches the emission surface is emitted by way of the CPC element. Fluorescent light that is directed to the end face opposite the emission surface is reflected in the direction of the emission surface by the mirror.

Patent Document 1 discloses a volume fluorescent light source having a square-column-shaped main body that contains a fluorescent substance (hereinbelow referred to as a "fluorescent rod") and a plurality of emitters that emit excitation light that is capable of exciting the fluorescent substance. One end face of the fluorescent rod is the emission surface for emitting fluorescent light that is discharged from the fluorescent substance. A plurality of light emitters (excitation light sources) are provided to face each surface of the fluorescent rod other than the emission surface. The other end face of the fluorescent rod is provided with a reflective coating having the property of transmitting excitation light and reflecting fluorescent light.

In the volume fluorescent light source, as in the above-described HLD module, the fluorescent substance is excited by illumination of the fluorescent rod by each light-emitter and the fluorescent light discharged from the fluorescent substance is propagated through the interior of the rod to be emitted from the emission surface.

LITERATURE OF THE PRIOR ART

Patent Documents

Patent Document 1: Japanese Unexamined Patent Application Publication No. 2008-536266

Non-Patent Document

Non-Patent Document 1: Christoph Hoelen, Dick de Boer, Dominique Bruls, Joost van der Eyden, Rolf Koole, Yun Li, Mo Mirsadeghi, Vincent Vanbroekhoven, John-John Van den Bergh, and Patrick Van de Voorde, "LED light engine concept with ultra-high scalable luminance", Proc. SPIE 9768, Light-Emitting Diodes: Materials, Devices, and Applications for Solid State Lighting, XX, 976810 (8 Mar. 2016)

DISCLOSURE OF THE INVENTION

Problem to be Solved by the Invention

Higher luminance of a light source device is desired for realizing a high-luminance projector. However, as described in Non-Patent Document 1 and Patent Document 1, in a light source device provided with a fluorescent rod, the achievement of higher luminance entails the problems next described.

Increasing the number of excitation light sources that illuminate a fluorescent rod increases the light quantity of the excitation light that is irradiated upon the fluorescent substance, with the result that the light quantity of the fluorescent light that is produced inside the fluorescent rod increases, and higher luminance of the light source device can be achieved. However, when excitation light sources are arranged side by side to face the surface of the fluorescent rod, the number of excitation light sources that can be arranged depends on the size of the surface of the fluorescent rod. As a result, increasing the number of excitation light sources to realize higher luminance of the light source device is subject to a physical limitation.

Alternatively, the size of the fluorescent rod itself can also be increased to enable an increase of the number of excitation light sources. However, a projector is subject to the limitation known as etendue that is defined as the product of the cross-section area of the luminous flux and the divergence angle (the solid angle that is determined by light). In order to efficiently utilize light from a light source as projection light, the radiation-side etendue must be kept no greater than the intake-side etendue. The radiation-side etendue is here given by the multiplication value of the area of the light source and the divergence angle of the light that is emitted from this light source, and the intake-side etendue is given by the multiplication value of the area of the display element and the acceptance angle (solid angle) that is determined by the f-number of the projection lens. Taking this limitation of etendue into consideration, a large fluorescent rod increases the radiation-side etendue and is therefore not preferable.

It is an object of the present invention to provide a light source device in which the number of excitation light sources can be increased without increasing the size of the fluorescent rod and thus achieve higher luminance to solve the above-described problem, and to provide a projector that uses this light source device.

Means for Solving the Problem

According to one aspect of the present invention for achieving the above-described object, a light source device is provided that includes:
  a fluorescent rod that is composed of a columnar light guide body that contains a fluorescent substance, one of two end faces of the light guide body being an emission end face that emits fluorescent light that is discharged from the fluorescent substance;
  at least one first light guide element that is provided with a first end face, a second end face having an area that is smaller than that of the first end face, and a side surface portion that reflects light incident from the first end face to condense upon the second end face, the second end face being optically joined with a surface of the light guide body except for the emission surface;
  a plurality of first excitation light sources that are provided to face the first end face of the first light guide element and that emit excitation light that is capable of exciting the fluorescent substance toward the first end face; and
  a first dichroic film that is provided on the surface of the light guide body except for the emission surface and that has a property of transmitting the excitation light and of reflecting the fluorescent light.

According to another aspect of the present invention, a projector is provided that includes:
  the above-described light source device;
  a display element that modulates the emitted light of the light source device to form images; and
  a projection lens that projects images formed in the display element.

Effect of the Invention

According to the present invention, the number of excitation light sources can be increased without increasing the size of a fluorescent rod to achieve higher luminance of a light source device.

BRIEF DESCRIPTION OF THE DRAWINGS

FIG. 1 is a schematic view showing the configuration of a light source device according to the first example embodiment of the present invention.

FIG. 2 is a schematic view for describing the fluorescent light output operation of the light source device shown in FIG. 1.

FIG. 3 is a schematic view showing the configuration of the light source device according to the second example embodiment of the present invention.

FIG. 4 is a schematic view showing the configuration of the light source device according to the third example embodiment of the present invention.

FIG. 5 is a schematic view showing the configuration of the light source device according to the fourth example embodiment of the present invention.

FIG. 6 is a schematic view showing the configuration of the light source device according to the fifth example embodiment of the present invention.

FIG. 7 is a schematic view showing the configuration of a light source device that is a modification of the present invention.

FIG. 8 is a schematic view showing the configuration of a projector that is the sixth example embodiment of the present invention.

FIG. 9 is a schematic view that shows the configuration of a projector that is the seventh example embodiment of the present invention.

EXAMPLE EMBODIMENTS

Example embodiments of the present invention are next described with reference to the accompanying drawings.

First Example Embodiment

FIG. 1 is a schematic view showing the configuration of a light source device according to the first example embodiment of the present invention.

Referring to FIG. 1, the light source device includes: fluorescent rod 101, CPC (Compound Parabolic Concentrator) elements 102 and 103, a plurality of LEDs 11, lens 104, dichroic films 105 and 106, and a plurality of laser light sources 12.

Fluorescent rod 101 is a wavelength-converting member composed of a columnar light guide body. The light guide body is composed of a transparent material that contains a fluorescent substance. Of the two end faces of the light guide body, one end face is an emission end face that emits fluorescent light that is discharged from the fluorescent substance, and the other end face is an incident end face into which excitation light is irradiated to excite the fluorescent substance. The side surfaces of the light guide body can also be used as surfaces into which excitation light is irradiated to excite the fluorescent substance. When used in a projector, the use of a prismatic light guide body is preferable.

The transparent material is, for example, inorganic crystal, glass, or a polymer material. The fluorescent substance is, for example, rare-earth ions, transition metal ions, organic dye molecules, or a phosphor. Examples of materials that can be used as the fluorescent substance include an inorganic crystal doped with rare-earth ions such as cerium-doped yttrium-aluminum garnet (Ce:YAG) or doped with transition metal ions such as sapphire doped with chrome or sapphire doped with titanium.

In the present example embodiment, fluorescent rod 101 is formed using glass material that contains Ce:YAG, and fluorescent rod 101 emits yellow fluorescent light that contains light of the green wavelength band and the red wavelength band.

CPC elements 102 and 103 are optical elements composed of solid light guide bodies that are provided with side surfaces having parabolic curved surfaces. CPC element 103 can be referred to as the first light guide element, and CPC element 102 can be referred to as the second light guide element. A material such as optical glass or optical resin can be used as the material of the light guide bodies. The shape of a cross section that is perpendicular to the optical axis of a light guide body can be a rectangle. In this case, both end faces of a light guide body may be formed in a rectangular shape having a desired aspect ratio. For example, when used in a projector, the two end faces of a light guide body may be formed in a shape similar to the aspect ratio of the display panel.

Of the two end faces of a light guide body, the area of the end face that is the first end face is greater than the area of the second end face that is the other end face. When the first end face (the face having the larger area) is used as the incident surface, the light irradiated from the first end face is condensed by being reflected by the side surfaces, and this condensed light is then emitted from the second end face. On the other hand, when the second end face (the face having the smaller area) is used as the incident surface, the light irradiated from the second end face is caused to diverge by being reflected by the side surfaces, and this divergent light is then emitted from the second end face. This type of CPC element is widely used in fields such as solar energy (solar batteries), wireless communication, biomedicine, and is also used for purposes in which light that is radiated divergently from light sources such as LEDs is condensed.

In CPC element 102, the second end face (the face having the smaller area) is used as the incident surface, and this second end face is optically joined to the emission end face of fluorescent rod 101. Here, "optically joined" means that CPC element 102 and fluorescent rod 101 are joined such that almost all of the light emitted from one end face is irradiated into the other end face. In this case, the size and shape of the second end face of CPC element 102 match the size and shape of the emission end face of fluorescent rod 101.

In CPC element 103, the first end face of the light guide body (the face having the larger area) is used as the incident end face. The second end face (the face having the smaller area) of CPC element 103 is optically joined to the incident end face fluorescent rod 101. Here, the size and shape of the second end face of CPC element 103 match the size and shape of the incident end face of fluorescent rod 101.

CPC elements 102 and 103 may be made up from light guide bodies of the same structure or may be made up from light guide bodies of differing material and shape. In the present example embodiment, light guide bodies of the same structure are used as CPC elements 102 and 103.

Dichroic film 106 is provided on the interface of the second end face of CPC element 102 and the emission end face of fluorescent rod 101. Dichroic film 106 has the properties of reflecting excitation light for exciting the fluorescent substance and of transmitting fluorescent light that is discharged from the fluorescent substance. The fluorescent substance in this case discharges yellow fluorescent light, and dichroic film 106 therefore has the property of reflecting light of the blue wavelength band and transmitting light of the green wavelength band and red wavelength band. Dichroic film 106 having these properties can be formed using, for example, a dielectric multilayer film.

Dichroic film 105 is provided on the interface of the second end face of CPC element 103 and the incident end face of fluorescent rod 101. Dichroic film 105 has the properties of transmitting excitation light for exciting the fluorescent substance and of reflecting the fluorescent light discharged from the fluorescent substance. Because the fluorescent substance discharges yellow fluorescent light that contains light of the green wavelength band and red wavelength band in this case, dichroic film 105 has the properties of transmitting light of the blue wavelength band and reflecting light of the green wavelength band and red wavelength band. Dichroic film 105 having these properties can be formed using, for example, a dielectric multilayer film.

All of the plurality of LEDs 11 and the plurality of laser light sources 12 are excitation light sources for exciting the fluorescent substance.

The plurality of LEDs 11 are provided to face at least one side surface of the four side surfaces of fluorescent rod 101, and each LED 11 emits blue light toward fluorescent rod 101. Blue LEDs are low in cost and can be obtained in high-output form. Blue laser light sources may also be used in place of LEDs 11.

An increase in the light quantity of excitation light can be expected according to increase of the number of LEDs 11. The number of LEDs 11 can be set as appropriate according to the specifications of the light source device, but the maximum number of LEDs 11 is subject to the physical limitation imposed by the size (area) of the side surface of the fluorescent rod 101. LEDs 11 can be arranged on all four side surfaces of fluorescent rod 101. In this case, the light quantity of excitation light that can be obtained can be expected to be four times that of a case in which LEDs 11 are arranged on just one side surface.

The plurality of laser light sources 12 are arranged to face the first end face (the face having the larger area) of CPC element 103, and each laser light source 12 emits blue laser light as excitation light toward CPC element 103. An increase in the light quantity of excitation light can be anticipated according to an increase of the number of laser light sources 12. The number of laser light sources 12 can be set as appropriate according to the specifications of the light source device, but the maximum number of laser light sources 12 is subject to the physical limitation imposed by the size (area) of the first end face of CPC element 103. Solid-state light sources such as LEDs that supply blue light may also be used in place of laser light sources 12.

Lens 104 is arranged between the plurality of laser light sources 12 and the first end face of CPC element 103. Lens 104 is used for efficiently irradiating the blue laser light from each laser light source 12 upon the first end face of CPC element 103. Lens 104 is made up from, for example, a convex lens. Lens 104 may be a lens group composed of a plurality of lenses. Lens 104 may be omitted when the blue laser light from each laser light source 12 can be adequately taken into CPC element 103.

The actual fluorescent light output operation of the light source device of the present example embodiment is next described.

FIG. 2 is a schematic view for describing the fluorescent light output operation of the light source device of the present example embodiment. In the following explanation, the fluorescent substance that is contained in fluorescent rod 101 is referred to as phosphor particles, and the emitted light of LED light sources 11 and laser light sources 12 are both referred to as excitation light. In addition, it is assumed that the excitation light is blue light and that the phosphor particles receive the excitation light and discharge yellow fluorescent light.

The excitation light that is emitted from each LED light source 11 is irradiated upon the side surface of fluorescent rod 101. In fluorescent rod 101, the excitation light that is irradiated from the side surface collides with the phosphor particles. Excited by the excitation light, the phosphor particles isotropically discharge yellow fluorescent light from the phosphor particles. In FIG. 2, light ray 26a represents one light ray of excitation light that is emitted from LED 11, and light rays 22 and 24 each represent one light ray of yellow fluorescent light discharged from a phosphor particle.

On the other hand, excitation light emitted from laser light sources 12 is irradiated upon the first end face of CPC element 103 by way of lens 104. The emitted light of laser light sources 12 is divergent light having a slight spread, and as a result, the use of lens 104 enables the excitation light from each laser light source 12 to be efficiently irradiated upon the first end face of CPC element 103.

In CPC element 103, the excitation light that is irradiated from the first end face arrives at the second end face either directly or by being reflected by the side surfaces. The excitation light that arrives at the second end face is transmitted through the second end face and is transmitted through dichroic film 105. The excitation light that is transmitted through dichroic film 105 is irradiated upon the incident end face of fluorescent rod 101. In fluorescent rod 101, the excitation light that is irradiated from the incident end face collides with phosphor particles. The phosphor particles are excited by the excitation light, and yellow fluorescent light is isotropically discharged from the phosphor particles. In FIG. 2, light ray 26b represents one light ray that is emitted from laser light sources 12, and light rays 23 and 25 each represent a light ray of yellow fluorescent light that is discharged from a phosphor particle.

The yellow fluorescent light that is discharged from phosphor particles is propagated inside fluorescent rod 101. At the rod side surfaces, the yellow fluorescent light in which the angle of incidence exceeds the critical angle undergoes total reflection, and yellow fluorescent light in which the angle of incidence is no greater than the critical angle is emitted to the outside from the rod side surfaces. More specifically, the angle of incidence with respect to the rod side surface for each of light ray 22 and light ray 23 is no greater than the critical angle, and light ray 22 and light ray 23 are therefore both emitted to the outside from the rod side surfaces. On the other hand, the angle of incidence with respect to the rod side surface for each of light ray 24 and light ray 25 is greater than the critical angle, and light ray 24 and light ray 25 therefore both undergo total reflection at the rod side surfaces.

Of the yellow fluorescent light that is propagated inside fluorescent rod 101 while being repeatedly subjected to total reflection at the rod side surfaces, the yellow fluorescent light that is directed toward the CPC element-102 side (emission end face side) reaches the emission surface of fluorescent rod 101. For example, light ray 24 and light ray 25 repeatedly undergo total reflection at the rod side surfaces and arrive at the emission end face of fluorescent rod 101.

On the other hand, of the yellow fluorescent light propagated inside fluorescent rod 101 while being repeatedly subjected to total reflection at the rod side surfaces, the yellow fluorescent light that is directed to the CPC element-103 side (the incident end face side) is reflected toward the CPC element-102 side (the emission end face side) by dichroic film 105. The yellow fluorescent light that is the reflected light from dichroic film 105 is propagated inside fluorescent rod 101 in the direction of the CPC element-102 side (the emission end face side) and arrives at the emission end face.

In fluorescent rod 101, the yellow fluorescent light that arrives at the emission end face is emitted from the emission end face. The yellow fluorescent light that is emitted from the emission end face of fluorescent rod 101 is transmitted through dichroic film 106 and irradiated upon the second end face of CPC element 102.

At CPC element 102, the yellow fluorescent light that is irradiated from the second end face arrives at the first end face either directly or by being reflected by side surfaces. The yellow fluorescent light that arrives at the first end face is emitted from the first end face as light rays (divergent light) 21.

Alternatively, at fluorescent rod 101, a portion of the excitation light that is irradiated from the side surfaces and the incident end face is propagated inside fluorescent rod 101 and arrives at the emission end face. The excitation light that arrives at the emission end face is reflected toward the incident end face side by dichroic film 106. The excitation light that is the reflected light from dichroic film 106 is again propagated inside fluorescent rod 101, and in the process of this propagation, excites the phosphor particles.

According to the light source device of the present example embodiment, LEDs 11 and laser light sources 12 that are the excitation light sources are arranged on the side-surface side and incident end face side of fluorescent rod 101, and the phosphor particles inside fluorescent rod 101 can thus be excited by the excitation light from these excitation light sources.

On the incident end face side of fluorescent rod 101, the plurality of laser light sources 12 are arranged to face the first end face of CPC element 103, and the excitation light from each laser light source 12 is incident to the incident end face of fluorescent rod 101 by way of CPC element 103. By means of this configuration, the following action and effects are exhibited.

The area of the first end face of CPC element 103 is greater than the area of the incident end face of fluorescent rod 101. If laser light sources 12 are arranged to face the incident end face of fluorescent rod 101 without CPC element 103, the number of laser light sources 12 that can be disposed is determined by the size of the incident end face of fluorescent rod 101. In the present example embodiment, in contrast, laser light sources 12 are arranged to face the first end face of CPC element 103 that has a greater area than the incident end face of fluorescent rod 101, and the number of laser light sources 12 that can be arranged can therefore be increased. As a result, the quantity of fluorescent light that is emitted from fluorescent rod 101 can be increased and higher luminance of the light source device can be achieved.

Further, simply providing only CPC element 103 at the incident end face of fluorescent rod 101 without dichroic film 105 results in the problems next described.

Because the refractive indices of CPC element 103 and fluorescent rod 101 are equivalent, the fluorescent light that is propagated inside fluorescent rod 101 and that arrives at the interface of the second end face of CPC element 103 and the incident end face of fluorescent rod 101 is transmitted through the interface without being reflected. Virtually all of this fluorescent light that is transmitted through the interface is emitted from the first end face of CPC element 103 and thus lost.

In the present example embodiment, dichroic film 105 is provided at the interface of the second end face of CPC element 103 and the incident end face of fluorescent rod 101 to solve the above-described problem of the loss of fluorescent light that occurs due to the provision of CPC element 103. By means of this configuration, fluorescent light that is propagated inside fluorescent rod 101 and that arrives at the interface is reflected by dichroic film 105, and the fluorescent light that is this reflected light is again propagated inside fluorescent rod 101 to arrive at the emission end face. By thus providing dichroic film 105, the loss of fluorescent light can be reduced and the quantity of fluorescent light that is emitted from emission end face of fluorescent rod 101 can be increased.

As described above, the light source device of the present example embodiment enables an increase of the quantity of fluorescent light emitted from the emission end face of fluorescent rod 101 by providing dichroic film 105 at the interface of the second end face of CPC element 103 and the incident end face of fluorescent rod 101. As a result, higher luminance of the light source device can be achieved.

Second Example Embodiment

FIG. 3 is a schematic view showing the configuration of a light source device according to the second example embodiment of the present invention.

The light source device of the present example embodiment differs from that of the first example embodiment in that CPC elements are provided on the side surface of fluorescent rod 101 to dispose excitation light sources. In the light source device of the present example embodiment, CPC elements 301 and 302, reflecting element 303, and dichroic films 304 and 305 are provided in place of CPC element 103, laser light sources 12, lens 104, and dichroic film 105.

CPC elements 301 and 302 are constituted by light guide bodies identical to CPC element 103 described in the first example embodiment, and the second end faces of the light guide bodies (the end faces having the smaller areas) are optically joined to side surface 101a of fluorescent rod 101. In this case, CPC elements 301 and 302 have the same size and same shape. A plurality of LEDs 11 are arranged to face the first end faces (the faces having the larger area) of each of CPC elements 301 and 302. Alternatively, the number of CPC elements provided at side surface 101a of fluorescent rod 101 may be only one or may be three or more. The number of CPC elements provided at the rod side surfaces can be determined according to the sizes of fluorescent rod 101 and the CPC elements.

Dichroic films 304 and 305 are the same as dichroic film 105 described in the first example embodiment and have the properties of transmitting excitation light and reflecting fluorescent light. Dichroic film 304 is provided at the interface of the second end face of CPC element 301 and side surface 101a of fluorescent rod 101. Dichroic film 305 is provided at the interface of the second end face of CPC element 302 and side surface 101a of fluorescent rod 101.

Reflection element 303 is arranged to face the incident end face of fluorescent rod 101. Reflection element 303 is preferably arranged as close as possible to the incident end face of fluorescent rod 101. As reflection element 303, a metal that forms a reflecting surface may be vapor deposited on one surface of a transparent substrate. Alternatively, a reflecting surface may be formed directly on the incident end face of fluorescent rod 101.

The fluorescent light emission operation of the light source device of the present example embodiment is next described.

A plurality of LEDs 11 are arranged to face side surface 101a of fluorescent rod 101 and the excitation light from each LED 11 is irradiated directly upon side surface 101a of fluorescent rod 101.

In addition, a plurality of LEDs 11 are arranged to face the first end face of each of CPC elements 301 and 302. In each of CPC elements 301 and 302, the excitation light incident from the first end face reaches the second end face either directly or by being reflected by the side surfaces. The excitation light that reaches the second end face is transmitted by the second end face and is transmitted through dichroic films 304 and 305. The excitation light that is transmitted through dichroic films 304 and 305 is irradiated upon the side surface 101a of fluorescent rod 101. In FIG. 3, light ray 31 represents a ray of excitation light that is emitted from LED 11.

In fluorescent rod 101, the phosphor particles are excited by the excitation light incident from side surface 101a, and yellow fluorescent light is isotropically discharged from the phosphor particles. The yellow fluorescent light that is discharged from the phosphor particles is propagated inside fluorescent rod 101.

Of the yellow fluorescent light that is propagated inside fluorescent rod 101 while repeatedly undergoing total reflection at the rod side surfaces, the yellow fluorescent light that is directed toward the CPC element-102 side (the emission end face side) is emitted by way of CPC element 102 from the emission end face of fluorescent rod 101. On the other hand, the yellow fluorescent light that is directed toward the reflecting element 303 side (the incident end face side) is reflected in the direction of the CPC element-102 side (the emission end face side) by reflecting element 303. The yellow fluorescent light that is the reflected light from reflecting element 303 is propagated inside fluorescent rod 101 and is emitted by way of CPC element 102 from the emission end face of fluorescent rod 101.

In addition, in fluorescent rod 101, a portion of the excitation light that is irradiated from side surface 101a is propagated inside fluorescent rod 101 and reaches the emission end face. The excitation light that reaches the emission end face is reflected toward the incident end face side by dichroic film 106. The excitation light that is the reflected light from dichroic film 106 is again propagated inside fluorescent rod 101, and in the process of propagation, excites the phosphor particles.

According to the light source device of the present example embodiment, the provision of CPC elements 301 and 302 on the side surface of fluorescent rod 101 enables an increase of the number of LEDs 11 that can be arranged on side surface 101a of fluorescent rod 101. As a result, the quantity of fluorescent light that is emitted from fluorescent rod 101 can be increased, and higher luminance of the light source device can be achieved.

Merely providing only CPC elements 301 and 302 on side surface 101a of fluorescent rod 101 without dichroic films 304 and 305 results in the problems described below.

The refractive indices of CPC elements 301 and 302 and fluorescent rod 101 are equivalent, and as a result, fluorescent light that is propagated inside fluorescent rod 101 and that arrives at the interface of the second end face of CPC elements 301 and 302 and side surface 101a of fluorescent rod 101 is transmitted through the interface without being reflected. Virtually all of the fluorescent light that is transmitted through this interface is emitted from the first end face of CPC elements 301 and 302 and is therefore lost.

In the present example embodiment, in order to solve the problem of the loss of fluorescent light that results from the provision of CPC elements 301 and 302, dichroic films 304 and 305 are provided on the interfaces of side surface 101a of fluorescent rod 101 and the second end faces CPC elements 301 and 302, respectively. By means of this configuration, the fluorescent light that is propagated inside fluorescent rod 101 and that arrives at the interfaces is reflected by dichroic films 304 and 305, and the fluorescent light that is this reflected light is again propagated inside fluorescent rod 101 to arrive at the emission end face. This provision of dichroic films 304 and 305 can therefore reduce the loss of fluorescent light and can increase the quantity of fluorescent light that is emitted from the emission end face of fluorescent rod 101.

Third Example Embodiment

FIG. 4 is a schematic view showing the light source device according to the third example embodiment of the present invention.

The light source device of the present example embodiment differs from the second example embodiment in that CPC elements are provided on two side surfaces of fluorescent rod 101 that face each other to further dispose excitation light sources. In the light source device of the present example embodiment, CPC elements 401 and 402 and dichroic films 404 and 405 are provided in addition to the configuration of the second example embodiment.

CPC element 401 and 402 are constituted by light guide bodies identical to CPC element 103 that was described in the first example embodiment, and the second end faces (the faces having the smaller areas) of the light guide bodies are optically joined to side surface 101b of fluorescent rod 101. In this example, CPC elements 401 and 402 have the same size and shape. A plurality of LEDs 11 are arranged to face the first end faces (the faces having the larger areas) of each of CPC elements 401 and 402. Alternatively, the number of CPC elements provided at each side surface of fluorescent rod 101 may be only one or may be three or more. The number of CPC elements provided on the rod side surface can be determined according to the sizes of fluorescent rod 101 and the CPC elements.

Dichroic films 404 and 405 are identical to dichroic film 105 that was described in the first example embodiment and have the properties of transmitting excitation light and reflecting fluorescent light. Dichroic film 404 is provided on the interface of the first-second end face of CPC element 401 and side surface 101b of fluorescent rod 101, and dichroic film 405 is provided on the interface of the second end face of CPC element 402 and side surface 101b of fluorescent rod 101.

According to the light source device of the present example embodiment, the provision of CPC elements 401 and 402 on side surface 101b of fluorescent rod 101 further increases the number of arranged LEDs 11 compared to the second example embodiment, and as a result, enables still higher luminance of the light source device.

Fourth Example Embodiment

FIG. 5 is a schematic view showing the configuration of the light source device according to the fourth example embodiment of the present invention.

The light source device of the present example embodiment differs from the first example embodiment in that CPC element 501 and laser light sources 51 are provided in place of CPC element 103, laser light sources 12, and lens 104.

Laser light sources 51 are identical to laser light sources 12 described in the first example embodiment. CPC element 501 is constituted by a light guide body similar to CPC element 103 described in the first example embodiment, but the area of the first end face of CPC element 501 is greater than the area of the first end face of CPC element 103. By enlarging the area of the first end face, the number of dispositions of laser light sources 51 is increased over the number of dispositions of laser light sources 12 of the first example embodiment, whereby a light source device of still higher luminance can be realized.

Fifth Example Embodiment

FIG. 6 is a schematic view showing the configuration of a light source device according to the fifth example embodiment of the present invention.

The light source device of the present example embodiment differs from the first example embodiment in that CPC element 102 that is provided at the emission end face of fluorescent rod 101 is used to irradiate excitation light into fluorescent rod 101.

The light source device of the present example embodiment includes reflecting element 303, dichroic mirror 701, and excitation light source unit 71 in place of CPC element 103, laser light sources 12, lens 104 and dichroic films 105 and 106.

Reflecting element 303 is identical to the component described in the second example embodiment. The second end face of CPC element 102 is optically joined to the emission end face of fluorescent rod 101, and in contrast to the first example embodiment, dichroic film 106 is not provided between the second end face of CPC element 102 and the emission end face of fluorescent rod 101.

Dichroic mirror 701 has the properties of reflecting excitation light and transmitting fluorescent light (the same properties as dichroic film 106). Dichroic mirror 701 is arranged at a position that faces the first end face of CPC element 102 so as to intersect the emission optical axis of CPC element 102 at an angle of approximately 45 degrees.

Excitation light source unit 71 includes a plurality of laser light sources 71a and lens 71b. Laser light sources 71a and lens 71b are identical to the laser light sources 12 and lens 104 that were described in the example embodiment. The excitation light that is emitted from each laser light source 71a is irradiated into dichroic mirror 701 by way of lens 71b. Alternatively, LEDs can be used in place of laser light sources 71a.

In dichroic mirror 701, the excitation light from excitation light source unit 71 is reflected toward the second end face of CPC element 102. The excitation light that is the reflected light from dichroic mirror 701 is irradiated into fluorescent rod 101 by way of CPC element 102.

In fluorescent rod 101, the excitation light that is irradiated from the rod side surface and the excitation light that is irradiated from CPC element 102 are used to excite the phosphor particles. The fluorescent light that is discharged from the phosphor particles is propagated inside fluorescent rod 101, and the fluorescent light that reaches the emission end face is emitted by way of CPC element 102. The fluorescent light that is emitted from the first end face of CPC element 102 is transmitted through dichroic mirror 701.

Of the fluorescent light that is propagated inside fluorescent rod 101, the fluorescent light that is directed toward the end face that is on the opposite side from the emission end face is reflected toward the emission end face side by reflecting element 303. In addition, the excitation light that is directed toward the end face that is on the opposite side from the emission end face through the interior of fluorescent rod 101 is reflected toward the emission end face side by reflecting element 303. The excitation light that is the reflected light from reflecting element 303 is again propagated inside fluorescent rod 101 toward the emission end face, and in the process of being propagated, excites the phosphor particles.

In the light source device of the present example embodiment, since laser light sources 71a that are the excitation light sources are arranged to face the first end face of CPC element 102 that has greater area than the emission end face of fluorescent rod 101, the number of dispositions of laser light sources 71a increases. As a result, a light source device of higher luminance can be achieved.

In addition, CPC element 102 also functions both as an element that irradiates excitation light upon fluorescent rod 101 and as an element that causes fluorescent light to be emitted from fluorescent rod 101. Providing the two functions of a CPC element for excitation and a CPC element for fluorescent light by means of a single CPC element in this way enables a reduction in size and a decrease of cost of the combined portion of fluorescent rod and CPC element.

Modification

FIG. 7 is a schematic view showing the configuration of a light source device that is a modification of the present invention.

Referring to FIG. 7, the light source device of this example differs from the first example embodiment in that excitation light source unit 60 and reflecting element 303 are used in place of CPC element 103 for excitation and dichroic film 105.

Reflecting element 303 is the same as the component described in the second example embodiment.

Excitation light source unit 60 includes a plurality of laser light sources 61, a plurality of field lenses 62, fly-eye lenses 63a and 63b, and lenses 64 and 65. Laser light sources 61 are similar to laser light sources 12 described in the first example embodiment.

Field lenses 62 are provided for each of laser light sources 61. The excitation light from each laser light source 61 is irradiated into fly-eye lenses 63a and 63b by way of a corresponding field lens 62. Fly-eye lenses 63a and 63b are configured to superpose the excitation light from each laser light source 61 upon the end face of fluorescent rod 101.

The excitation light from fly-eye lenses 63a and 63b is irradiated upon the incident end face of fluorescent rod 101 by way of lenses 64 and 65 and reflecting element 303.

According to the light source device of this example, the excitation light from each laser light source 61 can be condensed and superposed upon the incident end face of fluorescent rod 101 by means of fly-eye lenses 63a and 63b. The light quantity of excitation light that is incident from the incident end face of fluorescent rod 101 is therefore increased, enabling an increase in the light quantity of fluorescent light that is emitted from the emission end face of fluorescent rod 101. As a result, a higher-luminance light source device can be achieved.

The configurations described in the first to fifth example embodiments and the modification described above can be combined as appropriate. For example, the CPC elements for excitation described in the second or third example embodiment may be added to the configuration of the first or fourth example embodiment. Alternatively, any of, or a combination of two or more of, the CPC elements for excitation described in the first to fourth example embodiments may be added to the configuration of the fifth example embodiment. Still further, the excitation light source unit 60 described in the modification may be added in the configuration of any of the second, third, and fifth example embodiments.

In addition, from the viewpoint of the increase of light quantity of excitation light that is incident to fluorescent rod 101, CPC element 102 may be eliminated in the first to fifth example embodiments. However, CPC element 102 is preferably provided for efficiently extracting fluorescent light from fluorescent rod 101.

Still further, a dichroic film having the properties of reflecting fluorescent light and transmitting excitation light may also be formed on surfaces of fluorescent rod 101 except for the emission surface.

Using the light source device of the present invention described above as a light source of a projector allows high-luminance projectors to be developed.

For example, the light source device of the present invention can be applied to projectors in general that use fluorescent light as the illumination light that illuminates a display element (image-forming means) such as a DMD or liquid crystal panel. Combining the light source device of the present invention with a blue light source and red light source allows a full-color projected image to be obtained. The blue light source and red light source may be laser light sources or may be solid-state light sources such as LEDs.

By using laser light sources for the blue light source and red light source and combining these light sources with the light source device of the present invention, a projector having high luminance exceeding 10000 lumens (lm) can be provided. In this case, however, a blotchy pattern known as speckle occurs, and a countermeasure to reduce speckle becomes necessary.

Alternatively, using a solid-state light source such as LEDs for the blue light source and red light source and combining these light sources with the light source device of the present invention allows projected images having high image quality with superior color reproducibility to be developed. In this case, speckle does not occur.

Example embodiments of projectors that use the light source device of the present invention are next described.

Sixth Example Embodiment

FIG. 8 is a schematic view showing the configuration of the projector that is the sixth example embodiment of the present invention.

Referring to FIG. 8, the projector includes: light source device 81G; LED light sources 82R and 83R; dichroic mirrors 801 and 802; lens systems 803, 804, 807, and 808; reflecting mirrors 805 and 809; light tunnel 806; prism 811; DMD 810; and projection lens 812.

Light source device 81G is constituted by the light source device as described in any of the first to fifth example embodiments or the light source device of the modification or by a combination of these light source devices. In this case, light source device 81G is constituted by the light source device described in the first example embodiment and is configured to emit green fluorescent light.

LED light source 82B includes a blue LED and a plurality of lenses for converting the blue light that is emitted from this blue LED to substantially parallel light. A plurality of blue LEDs may also be provided. LED light source 83R includes a red LED and a plurality of lenses for converting the red light that is emitted from this red LED to substantially parallel light. A plurality of red LEDs may also be provided.

The optical axis of light source device 81G is orthogonal to the optical axis of LED light source 82B, and dichroic mirror 801 is arranged at the intersection of these optical axes. The angle formed by the optical axis of light source device 81G and dichroic mirror 801 is 45 degrees. The angle formed by the optical axis of LED light source 82B and dichroic mirror 801 is 45 degrees. The green fluorescent light that is emitted from light source device 81G is incident to one surface of dichroic mirror 801. The blue light that is emitted from LED light source 82B is incident to the other surface of dichroic mirror 801.

Dichroic mirror 801 has the properties of reflecting light of the blue wavelength band and transmitting light of the green wavelength band. The green fluorescent light from light source device 81G is transmitted through dichroic mirror 801, and the blue light from LED light source 82B is reflected by dichroic mirror 801. The green fluorescent light and blue light are emitted from dichroic mirror 801 on the same optical path.

The optical axis that is represented by the principal ray of the emitted light of dichroic mirror 801 orthogonally intersects the optical axis of LED light source 83R, and dichroic mirror 802 is arranged at the intersection of these optical axes. The angle formed by the optical axis of dichroic mirror 801 and dichroic mirror 802 is 45 degrees. The angle formed by the optical axis of LED light source 83R and dichroic mirror 802 is 45 degrees. The emitted light (green fluorescent light and blue light) of dichroic mirror 801 is incident to one surface of dichroic mirror 802. The red light emitted from LED light source 83R is incident to the other surface of dichroic mirror 802.

Dichroic mirror 802 has the properties of reflecting light of the red wavelength band and transmitting light of the green wavelength band and light of the blue wavelength band. The emitted light (green fluorescent light and blue light) of dichroic mirror 801 is transmitted through dichroic mirror 802, and the red light from LED light source 83R is reflected by dichroic mirror 802. The red light, green fluorescent light, and blue light are emitted from dichroic mirror 802 on the same optical path.

The emitted light (red light, green fluorescent light, and blue light) of dichroic mirror 802 is incident to the incident end face of light tunnel 806 by way of lens systems 803 and 804 and mirror 805. Lens systems 803 and 804 condense the emitted light of dichroic mirror 802 upon the incident end face of light tunnel 806.

Inside light tunnel 806, the incident light undergoes multiple reflections and as a result, light of uniform luminance is emitted. The light (red light, green fluorescent light, and blue light) that is emitted from light tunnel 806 is incident to prism 811 by way of lens systems 807 and 808 and mirror 809.

Prism 811 is made up of, for example, a TIR (Total Internal Reflection) prism. The light (red light, green fluorescent light, and blue light) from mirror 809 is reflected inside prism 811, and this reflected light is emitted toward DMD 810.

DMD 810 modulates the light (red light, green fluorescent light, and blue light) from prism 811 to form images. In the present example embodiment, the lighting operation of light source device 81G, LED light source 82B, and LED light source 83R is controlled such that the red light, green fluorescent light, and blue light successively illuminate DMD 810. DMD 810 successively emits red image light, green image light, and blue image light.

The emitted light (red image light, green image light, and blue image light) of DMD 810 is transmitted through prism 811 and is then incident to projection lens 812. Projection lens 812 successively enlarges and projects the red image light, green image light, and blue image light.

The projector of the present example embodiment exhibits the following action and effects.

In a projector that uses a green LED, blue LED, and red LED, the inadequacy of the luminance of the green LED results in difficulties for a high-luminance white display. In the projector of the present example embodiment, light source device 81G that is the green light source is made up by the light source device of any of the first to fifth example embodiments, the light source device of the modification, or a light source device that is a combination of these forms, whereby a high-luminance green light source can be provided. As a result, a high-luminance white display is possible.

In addition, laser light sources may also be used for LED light source 82B and LED light source 83R. In this case, a projector can be provided having even higher luminance.

Seventh Example Embodiment

FIG. 9 is a schematic view showing the configuration of the projector that is the seventh example embodiment of the present invention.

Referring to FIG. 9, the projector includes: light source device 91G; LED light sources 92B and 93R; dichroic mirrors 901, 902, 909, and 910; lens systems 903 and 904; fly-eye lenses 905 and 906; polarization conversion element 907; reflecting mirrors 908, 911, 912, and 915; condenser lenses 916, 917, and 918; liquid crystal panels 94B, 95G, and 96R; cross dichroic prism 919; and projection lens 920.

Light source device 91G, LED light sources 92B and 93R, dichroic mirrors 901 and 902, and lens systems 903 and 904 are components similar to light source device 81G, LED light sources 82B and 83R, dichroic mirrors 801 and 802, and lens systems 803 and 804 shown in FIG. 8.

Lens systems 903 and 904, fly-eye lenses 905 and 906, polarization conversion element 907, and reflecting mirror 908 are arranged in this order in the direction of advance of the emitted light (green fluorescent light, blue light, and red light) of dichroic mirror 902. The emitted light of dichroic mirror 902 is converted to substantially parallel light by lens systems 903 and 904 and then irradiated upon polarization conversion element 907 by way of fly-eye lenses 905 and 906. The use of fly-eye lenses 905 and 906 enables uniformization of the illuminance distribution on the incident surface of polarization conversion element 907.

Polarization conversion element 907 is a component that aligns the direction of polarization of the luminous flux from fly-eye lenses 905 and 906 and is made up of a component such as a polarization beam splitter or a phase plate. The emitted light of polarization conversion element 907 is reflected by reflecting mirror 908.

Dichroic mirror 909 and reflecting mirror 912 are arranged in succession in this order in the direction of advance of the reflected light of reflecting mirror 908. Dichroic mirror 909 has the properties of transmitting light of the blue wavelength band and reflecting light of the green wavelength band and light of the red wavelength band. The blue light that is transmitted through dichroic mirror 909 is reflected by reflecting mirror 912.

Condensing lens 916 and liquid crystal panel 94B are arranged in that order in the direction of advance of the blue light that is the reflected light from reflecting mirror 912. The blue light from reflecting mirror 912 is irradiated upon liquid crystal panel 94B by way of condensing lens 916. Liquid crystal panel 94B forms blue images. Although not shown in the figures, phase difference plates or polarizing plates are provided before and after liquid crystal panel 94B.

Dichroic mirror 910 and reflecting mirror 911 are arranged in that order in the direction of advance of the reflected light (green light and red light) from dichroic mirror 909. Dichroic mirror 910 has the properties of transmitting light of the red wavelength band and reflecting light of the green wavelength band. The red light that is transmitted through dichroic mirror 910 is reflected by reflecting mirror 911.

Condensing lens 917 and liquid crystal panel 95G are arranged in that order in the direction of advance of the reflected light (green light) from dichroic mirror 910. The green light from dichroic mirror 910 is irradiated upon liquid crystal panel 95G by way of condensing lens 917. Liquid crystal panel 95G forms green images. Although not shown in the figure, phase difference plates or polarizing plates are provided before and after liquid crystal panel 95G.

Lens systems 913 and 914 and reflecting mirror 915 are arranged in that order in the direction of advance of the red light that is the reflected light from reflecting mirror 911. Lens systems 913 and 914 are relay lenses. The red light from reflecting mirror 911 passes through lens systems 913 and 914 and is then reflected by reflecting mirror 915.

Condensing lens 918 and liquid crystal panel 96R are arranged in that order in the direction of advance of the reflected light (red light) of reflecting mirror 915. The red light from reflecting mirror 915 is irradiated upon liquid crystal panel 96R by way of condensing lens 918. Liquid crystal panel 96R forms red images. Although not shown in the figure, phase difference plates or polarizing plates are provided before and after liquid crystal panel 96R.

The emitted light from each of liquid crystal panels 94B, 95G, and 96R is mutually orthogonal, and cross dichroic prism 919 is arranged at the position of orthogonal intersection of this emitted light. Cross dichroic prism 919 includes first to third incident surfaces and an emission surface. Liquid crystal panels 94B, 95G, and 96R are arranged such that each faces a respective surface of the first to third incident surfaces. In addition, cross dichroic prism 919 includes first dichroic film having the properties of transmitting light of the red wavelength band and light of the green wavelength band and reflecting light of the blue wavelength band and second dichroic film having the properties of transmitting light of the blue wavelength band and light of the green wavelength band and reflecting light of the red wavelength band. The first and second dichroic films are provided so as to intersect with each other. Blue image light that is irradiated from the first incident surface, green image light that is irradiated from the second incident surface, and red image light that is irradiated from the third incident surface are emitted on the same optical path from the emission surface by way of the first and second dichroic films. The emitted light from the emission surface (blue image light, green image light, and red image light) is incident to projection lens 920.

Projection lens 920 enlarges and projects the emitted light (blue image light, green image light, and red image light) from dichroic prism 919.

A high-luminance and superior white display is also possible in the projector of the present example embodiment for the same reasons as for the projector described in the sixth example embodiment.

Laser light sources may also be used in place of LED light source 92B and LED light source 93R. In this case, a projector can be provided having even higher luminance.

The configurations described in the first to seventh example embodiment described above are only examples of the present invention, and these configurations are open to the application of modifications and improvements that do not depart from the gist of the present invention that will be clear to one of ordinary skill in the art.

The present invention can adopt the forms as shown in the following Supplementary Notes 1-17 but is not limited to these forms.

[Supplementary Note 1]

A light source device comprises:
   a fluorescent rod that is composed of a columnar light guide body that contains a fluorescent substance, one of two end faces of the light guide body being an emission end face that emits fluorescent light that is discharged from the fluorescent substance;
   at least one first light guide element that is provided with a first end face, a second end face having an area that is smaller than that of the first end face, and a side surface portion that reflects light incident from the first end face to condense upon the second end face, the second end face being optically joined with a surface of the light guide body expect for the emission surface;
   a plurality of first excitation light sources that are provided to face the first end face of the first light guide element and that emit excitation light that is capable of exciting the fluorescent substance toward the first end face; and
   a first dichroic film that is provided on the surface of the light guide body expect for the emission surface and that has a property of transmitting the excitation light and of reflecting the fluorescent light.

[Supplementary Note 2]

In the light source device described in Supplementary Note 1, at least one first light guide element is configured that the second end face is optically joined to an end face that is on the side opposite the emission end face of the light guide body, the first dichroic film being formed on an interface of the end face and the second end face.

[Supplementary Note 3]

In the light source device described in Supplementary Note 1 or 2, at least one first light guide element is configured that the second end face is optically joined to a side surface of the light guide body, the first dichroic film being formed on an interface of the side surface and the second end face.

[Supplementary Note 4]

In the light source device described in any one of Supplementary Notes 1 to 3, the first light guide element is constituted by a compound parabolic concentrator.

[Supplementary Note 5]

The light source device described in any one of Supplementary Notes 1 to 4 further comprises a second light guide element that is provided with a third end face, a fourth end face having a area that is smaller than that of the third end face, and a side surface portion that reflects light that is incident from the fourth end face to guide light toward the third end face, the fourth end face being optically joined to the emission surface of the light guide body.

[Supplementary Note 6]

The light source device described in Supplementary Note 5 includes a second dichroic film that is provided on an interface of the fourth end face and the emission surface of the light guide body that has a property of transmitting the fluorescent light and of reflecting the excitation light.

[Supplementary Note 7]

The light source device described in Supplementary Note 5 includes:
   a plurality of second excitation light sources that each emit in a same direction excitation light that is capable of exciting the fluorescent substance; and
   a dichroic mirror that is provided at a position at which an optical axis of each of the plurality of second excitation light sources orthogonally intersect an optical axis that is represented by a principal ray of fluorescent light that is emitted from the third surface of the second light guide element, and that is configured to reflect the excitation light toward the third surface of the second light guide element and to transmit fluorescent light that is emitted from the third surface of the second light guide element.

[Supplementary Note 8]

In the light source device described in any one of Supplementary Notes 5 to 7, the second light guide element is constituted by a compound parabolic concentrator.

[Supplementary Note 9]

In the light source device described in any one of Supplementary Notes 5 to 8, the first and second light guide elements are both the same size and shape.

[Supplementary Note 10]

In the light source device described in any one of Supplementary Notes 5 to 8, the first end face of the first light guide element is larger than the third end face of the second light guide element, and a light guide length that is a space between the first end face and the second end face of the first light guide element is longer than a light guide length that is a space between the third end face and the fourth end face of the second light guide element.

[Supplementary Note 11]

In the light source device described in any one of Supplementary Notes 5 to 10, the second excitation light source is an LED (Light Emitting Diode) or a laser light source.

[Supplementary Note 12]

The light source device described in any one of Supplementary Notes 1 to 11 further comprises at least one third excitation light source that is provided to face a side surface of the light guide body and that emits excitation light that is capable of exciting the fluorescent substance toward the side surface.

[Supplementary Note 13]

In the light source device described in Supplementary Note 12, the third excitation light source is an LED (Light Emitting Diode) or a laser light source.

[Supplementary Note 14]

In the light source device described in any one of Supplementary Notes 1 to 13, the first excitation light source is an LED (Light Emitting Diode) or a laser light source.

[Supplementary Note 15]

In the light source device described in any one of Supplementary Notes 1 to 14, the fluorescent substance discharges yellow fluorescent light or green fluorescent light.

[Supplementary Note 16]

A projector comprises:
the light source device described in any one of Supplementary Notes 1 to 15;
a display element that modulates the emitted light of the light source device to form images; and
a projection lens that projects images formed in the display element.

[Supplementary Note 17]

A projector comprising:
a green light source that is made up of the light source device described in any one of Supplementary Notes 1 to 15 and that emits green light;
a red light source that emits red light;
a blue light source that emits blue light;
an image forming means that modulates the green light, red light, and blue light to form green images, red images, and blue images; and
a projection means that projects the green images, red images, and blue images mutually superposed.

EXPLANATION OF REFERENCE NUMBERS

11 LED light source
12 laser light source
101 fluorescent rod
102, 103 CPC element
104 lens system
105, 106 dichroic film

The invention claimed is:

1. A light source device comprising:
a fluorescent rod that is composed of a columnar light guide body that contains a fluorescent substance, one of two end faces of said light guide body being an emission end face that emits fluorescent light that is discharged from said fluorescent substance;
at least one first light guide element that is provided with a first end face, a second end face having an area that is smaller than that of said first end face, and a side surface portion that reflects light incident from said first end face to condense upon said second end face, said second end face being optically joined with a surface of said light guide body except for said emission surface;
a plurality of first excitation light sources that are provided to face said first end face of said first light guide element and that emit excitation light that is capable of exciting said fluorescent substance toward said first end face;
a first dichroic film that is provided on said surface of said light guide body except for than said emission surface and that has a property of transmitting said excitation light and of reflecting said fluorescent light; and
a second light guide element that is provided with a third end face, a fourth end face having an area that is smaller than that of said third end face, and a side surface portion that reflects light that is incident from said fourth end face to guide light toward said third end face, said fourth end face being optically joined to said emission surface of said light guide body,
wherein:
said first end face of said first light guide element is larger than said third end face of said second light guide element, and a light guide length that is a space between said first end face and said second end face of said first light guide element is longer than a light guide length that is a space between said third end face and said fourth end face of said the second light guide element.

2. The light source device as set forth in claim 1, wherein:
at least one said first light guide element is configured that said second end face is optically joined to an end face that is on the side opposite said emission end face of said light guide body, said first dichroic film being formed on an interface of the end face and said second end face.

3. The light source device as set forth in claim 1, wherein:
at least one said first light guide element is configured that said second end face is optically joined to a side surface of said light guide body, said first dichroic film being formed on an interface of the side surface and said second end face.

4. The light source device as set forth in claim 1, further comprising:
a second dichroic film that is provided on an interface of said fourth end face and said emission surface of said light guide body and that has a property of transmitting said fluorescent light and of reflecting said excitation light.

5. The light source device as set forth in claim 1, further comprising:
a plurality of second excitation light sources that each emit in a same direction excitation light that is capable of exciting said fluorescent substance; and
a dichroic mirror that is provided at a position at which an optical axis of each of said plurality of second excitation light sources orthogonally intersect an optical axis that is represented by a principal ray of fluorescent light that is emitted from said third surface of said second light guide element, and that is configured to reflect said excitation light toward said third surface of said second light guide element and to transmit fluorescent light that is emitted from said third surface of said second light guide element.

6. The light source device as set forth in claim 1, further comprising:

at least one third excitation light source that is provided to face a side surface of said light guide body and that emits excitation light that is capable of exciting said fluorescent substance toward said side surface.

7. The light source device as set forth in claim 1, wherein said fluorescent substance discharges yellow fluorescent light or green fluorescent light.

8. A projector comprising:
the light source device as set forth in claim 1;
a display element that modulates the emitted light of said light source device to form images; and
a projection lens that projects images formed in said display element.

\* \* \* \* \*